Feb. 15, 1966  F. W. SCHWARTZ  3,235,771
OUTDOOR HOUSEHOLD LIGHTING ASSEMBLY
Filed May 17, 1962

INVENTOR.
FREDERICK W. SCHWARTZ
BY
ATTORNEY

United States Patent Office 3,235,771
Patented Feb. 15, 1966

3,235,771
OUTDOOR HOUSEHOLD LIGHTING ASSEMBLY
Frederick W. Schwartz, Providence, R.I., assignor to Cable Electric Products, Inc., Providence, R.I., a corporation of Rhode Island
Filed May 17, 1962, Ser. No. 195,569
4 Claims. (Cl. 315—276)

My present invention relates to outdoor lighting devices and more particularly to a household lighting assembly.

The principal object of the present invention is to provide a household outdoor lighting assembly in which the lights are designed to operate on 12 v. initially powered off the 110 v. house line.

A further object of the present invention is to provide an outdoor lighting assembly which is safe in damp or moist places such as wet grass or around a swimming pool.

Another object of the present invention is to provide a low voltage outdoor lighting assembly which is simple in construction and designed to be economically manufactured and assembled.

With the above and other objects and advantageous features in view, my invention consists of a novel arrangement of parts more fully disclosed in the detailed description following in conjunction with the accompanying drawings and more particularly defined in the appended claims.

Modern suburban living has brought in problems relating to the use of lighting certain areas around the house at night. For example in houses equipped with swimming pools it has been found desirable to light up the pool area at night. However, professional lighting installations are very expensive and consume large amounts of current. Attempts have been made to use outdoor lighting systems which with elongated cords can be plugged into the house line. However, because of the wet area around the swimming pool and the fact that the people are walking barefooted with wet feet, accidents have happened and there have been many cases of electrocution. Where the outdoor lighting from the house current has been tried on back lawns and similar areas the dampness of the grass has sometimes affected the wiring and electrocution and shock have been experienced here too. The present invention is designed to provide a lighting system which uses house current but which is transformed to a low 12 v. so that there is no danger from electrocution or shock. Furthermore, the system of the present invention has been designed so that a multiplicity of lights can be attached to a single unit.

Figure 1:
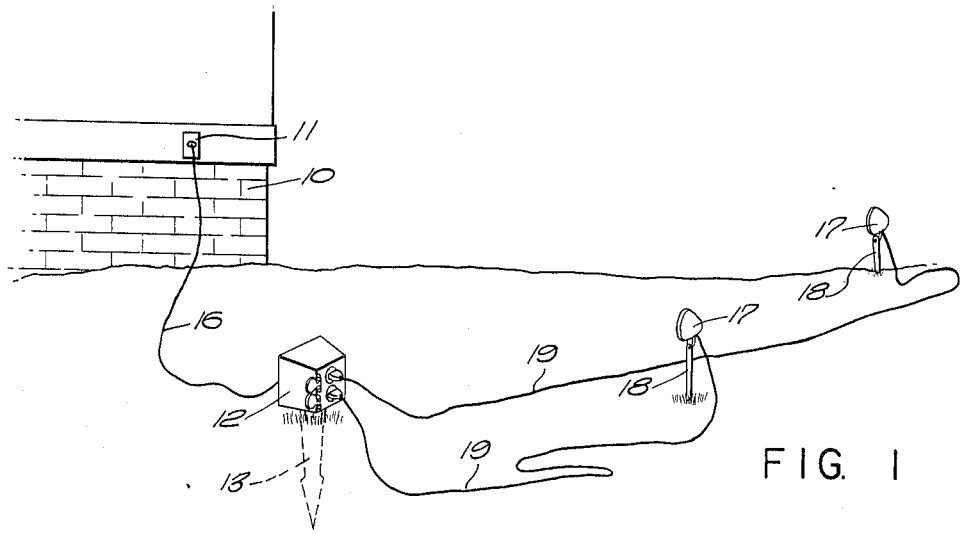
FIG. 1 is a perspective view of an outdoor lighting assembly embodying my present invention.

Referring more in detail to the drawings illustrating my invention, FIG. 1 is a general view of the system. The house 10 is provided with a standard outdoor 110 v. socket 11. A housing 12 is mounted on an integral stake 13 having a pointed end which can be driven into the ground near the house 10. The housing 12 is designed to hold a transformer 14 and a multiple electrical hookup 15. A flexible power supply cord 16 is plugged into the socket 11 and into the housing 12 as shown in FIG. 1. I now provide a plurality of individual spot lights 17 mounted on stakes 18 which can be driven into the ground, and connected by elongated cords 19 to the multiple socket 15. It is contemplated that the power line cord 16 be short because the housing 12 is driven into the ground close to the house. On the other hand the cords 19 are elongated to permit the lights 17 to be positioned in various strategic places around the lawn or swimming pool. Since the transformer 14 is designed to reduce the 110 v. house voltage to 12 v., any danger from the cords 19 is eliminated since only a very minor shock can be experienced from these lines. It is contemplated that the housing 12 be designed to take a minimum of four lights 17 in a single unit. This should adequately compensate for the reduced voltage involved.

Figures 2, 3:
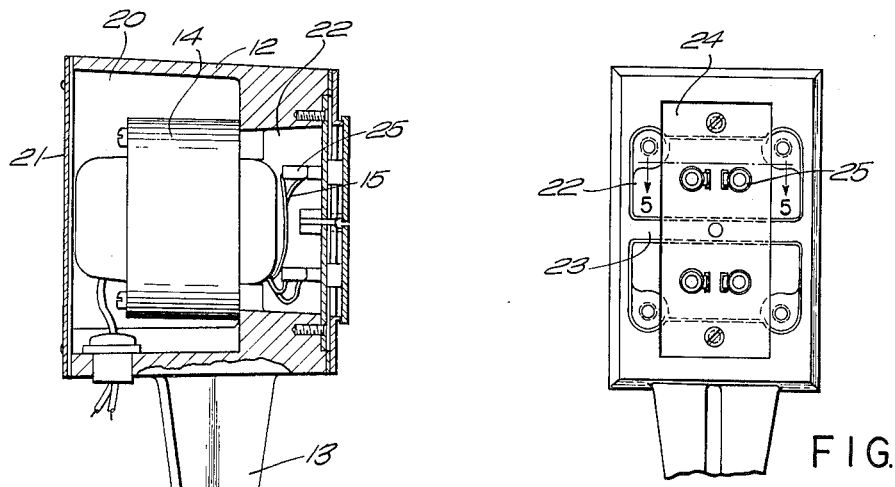
FIG. 2 is a vertical section through the transformer unit.
FIG. 3 is a plan view of the front face of the transformer unit with the cover removed.
Figure 5:
FIG. 5 is a side elevation of the socket arrangement shown in FIG. 3.
Figure 4:
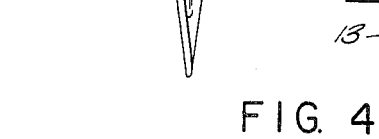
FIG. 4 is a view similar to FIG. 3 with the cover in place.

Referring to FIG. 2 the housing 12 is preferably cast out of a single block of metal together with the stake 13 as illustrated. It is provided with an enlarged chamber 20 in which the transformer 14 is mounted. A removable cover 21 is screwed to the back of the housing to close the chamber. The electrical cord connection 16 is preferably made at the bottom adjacent the rear portion. At the front end the housing 12 narrows to a smaller chamber 22 having a rectangular opening in the front in which a cross member 23 is positioned so that the plate 24 straddles across the front of the housing as shown in FIG. 3. Mounted in the plate 24, as can be seen in FIGS. 3 and 5 are phone type receptacles 25 arranged in pairs as shown in FIG. 3. The wiring 15 from the transformer 14 is designed to hook the various receptacles into the transformer so that each receptacle is individually wired to the transformer. Now referring to FIG. 4, the front portion of the housing as shown in FIG. 3 is provided with a cover 26 which may have a waterproof gasket thereunder. The cover 26 is provided with auxiliary individual cover portions 27 each covering a pair of phone receptacles 25. The auxiliary covers 27 may have spring hinges to keep them in closed position against the weather. This arrangement provides a considerable saving of space.

The inner ends of the connecting cords 19 are provided with phone plugs of the standard type which are pushed into the phone receptacles 25. This eliminates the necessity of a large contact plug and permits the plugging in of four different lights into a small area. Of course the phone receptacle plate or panel 24 may be designed to hold less than four or more than four receptacles as desired.

The entire assembly therefore provides a simple and inexpensive method of providing outdoor lighting in the 12 v. range thus eliminating all danger from electrocution. The assembly can be made cheaply and plugged into a standard 110 v. house current. It does not require professional installation and easily conforms to all underwriter's requirements. Other advantages of the present invention will be readily apparent to a person skilled in the art.

I claim:

1. In an outdoor lighting system in which a 110 v. house current is used to light a plurality of 12 v. lights, a transformer construction comprising a housing, a stake extending from said housing for driving into the ground adjacent the house, a transformer in said housing for reducing the 110 v. house current to 12 v., a removable line connecting the house current with said transformer, said transformer being connected to a plurality of sockets for receiving a plurality of extension cords to the 12 v. lights, said sockets being mounted in a plate in said housing, a cover for said housing over said plate, and auxiliary covers hinged in said cover to expose said sockets.

2. In an outdoor lighting system in which a 110 v. house current is used to light a plurality of 12 v. lights, a transformer construction comprising a housing, a stake extending from said housing for driving into the ground adjacent the house, a transformer in said housing for reducing the 110 v. house current to 12 v., a removable line connecting the house current with said transformer, said transformer being connected to a plurality of sockets for receiving a plurality of extension cords to the 12 v. lights, said sockets being mounted in a plate in said housing, a cover for said housing over said plate, and auxiliary covers hinged in said cover to expose said sockets, said stake being integrally formed with said housing.

3. In an outdoor lighting system in which a 110 v. house current is used to light a plurality of 12 v. lights, a transformer construction comprising a housing, a stake extending from said housing for driving into the ground adjacent the house, a transformer in said housing for reducing the 110 v. house current to 12 v., a removable line connecting the house current with said transformer, said transformer being connected to a plurality of sockets for receiving a plurality of extension cords to the 12 v. lights, said sockets being mounted in a plate in said housing, a cover for said housing over said plate, and auxiliary covers hinged in said cover to expose said sockets, said sockets being phone type for receiving pin terminals at the ends of the 12 v. lines.

4. In an outdoor lighting system in which a 110 v. house current is used to light a plurality of 12 v. lights, a transformer construction comprising a housing, a stake extending from said housing for driving into the ground adjacent the house, a transformer in said housing for reducing the 110 v. house current to 12 v., a removable line connecting the house current with said transformer, said transformer being connected to a plurality of sockets for receiving a plurality of extension cords to the 12 v. lights, said sockets being mounted in a plate in said housing, a cover for said housing over said plate, and auxiliary covers hinged in said cover to expose said sockets, said sockets being phone type for receiving pin terminals at the ends of the 12 v. lines, said stake being integrally formed with said housing.

References Cited by the Examiner

UNITED STATES PATENTS

| | | | |
|---|---|---|---|
| 342,552 | 5/1886 | Westinghouse | 307—17 |
| 2,976,503 | 3/1961 | Everhart | 336—94 |
| 3,104,064 | 9/1963 | Bellek | 240—11.2 |

JOHN W. HUCKERT, *Primary Examiner.*

ARTHUR GAUSS, *Examiner.*